United States Patent [19]

Langer et al.

[11] Patent Number: 4,668,289

[45] Date of Patent: May 26, 1987

[54] METHOD FOR RECLAIMING GOLD

[75] Inventors: Stanley H. Langer, Madison, Wis.; Abel Saud, Cincinnati, Ohio; George McDonald, Pennington, N.J.; James A. Koutsky, Madison, Wis.

[73] Assignee: Wisconsin Alumni Research Foundation, Madison, Wis.

[21] Appl. No.: 801,025

[22] Filed: Nov. 22, 1985

[51] Int. Cl.$^4$ .............................................. C22B 11/04
[52] U.S. Cl. ............................... 75/118 R; 75/101 R; 75/111; 423/27; 423/34; 423/38; 423/42; 423/46; 204/109
[58] Field of Search ................. 75/101 R, 117, 118 R, 75/111; 423/38, 46, 27, 34, 42; 204/105, 109

[56] References Cited

U.S. PATENT DOCUMENTS

| | | | |
|---|---|---|---|
| 3,692,647 | 9/1972 | Chambers et al. | 204/105 |
| 3,880,653 | 4/1975 | Hougen | 75/101 |
| 4,244,735 | 1/1981 | Reynolds et al. | 75/101 |
| 4,261,738 | 4/1981 | Valentine et al. | 75/103 |
| 4,266,972 | 5/1981 | Redond-Abad et al. | 75/101 |
| 4,423,011 | 12/1983 | Baglin et al. | 75/118 R |
| 4,426,225 | 1/1984 | Ida et al. | 75/118 |

FOREIGN PATENT DOCUMENTS 0072793  6/1979  Japan ..................................... 423/38

Primary Examiner—John Doll
Assistant Examiner—Robert L. Stoll
Attorney, Agent, or Firm—David J. Houser

[57] ABSTRACT

A method for reclaiming gold in metallic form from gold-containing scrap, including gold-containing base metal alloys and articles in which base metals are at least partially covered with a layer of gold. The method includes the steps of exposing the gold-containing scrap under an inert atmosphere to a leaching solution. The leaching solution has dissolved therein an oxidizing agent including metal ions capable of assuming at least two oxidation states, a portion of the metal ions being in the higher of the two oxidation states. The leaching solution also contains a complexing agent including halide ions in aqueous solution. By so exposing the gold-containing scrap to the leaching solution, base metal contained therein is dissolved to leave a solid metallic residue enriched in gold. The solid metallic residue then is collected mechanically.

13 Claims, No Drawings

METHOD FOR RECLAIMING GOLD

This invention was made with U.S. Government support under NSF Grant No. CPE 8119232 awarded by the National Science Foundation. The U.S. Government has certain rights in this invention.

Technical Field

The present invention relates in general to the reclaiming of precious metals from metallic scrap and, in particular, to reclaiming gold from alloys and mechanical combinations of gold and base metals.

BACKGROUND OF ART

Those skilled in the art are cognizant of a variety of methods for reclaiming gold from gold alloys with baser metals, gold-plated articles, and gold clad articles. The latter include articles referred to as "gold-filled" or identified as "rolled gold plate." in the United States, unless otherwise specified, both of those terms refer to articles made of base metals to which a sheet of gold not less than 10 kt in quality has been attached. The attachment may be to one or more surfaces by soldering, braising, welding, or other mechanical means. Articles designated as "gold-filled" must have a surface layer of 10 kt or purer gold wherein the karat gold is at least 120th of the total weight of the article. Articles having thinner coatings of gold may be marked "rolled gold plate." Watch cases are a specific exception in that the thickness of the gold cladding the article rather than its weight relative to the whole article is made the criterion for quality classification. In addition to gold recovery from scrap jewelry and other ornamental goldware, gold recovery from printed circuit boards and comparable electronic equipment is important. As used herein, a "base metal" is one more subject to oxidation and generally more reactive than gold. Gold, copper, or other metals in a zero oxidation state shall be referred to as being in a "metallic" or "elemental" form, in contrast to the reacted or oxidized form of a positive metal ion.

Gold-containing alloys, such as those used for jewelry, commonly contain significant amounts of copper and, in certain instances, nickel, silver, and other metals included to harden or modify the color of the resulting alloy. Watch cases and other decorative articles are commonly made of brass, bronze, or other base metal alloys that usually contain a large proportion of copper as well as zinc, tin, or other metals. More rarely, gold is applied as plating over or otherwise is used in conjunction with ferrous materials. In electronic circuit boards and the like, gold is commonly plated over copper and occasionally also extends over solders, which are predominately lead, tin, and zinc.

In many of the scrap articles of the sort just referred to, the base metals associated with the gold are partially or entirely deliberately covered by the gold, either for decorative purposes or because the gold is being applied for protective purposes, commonly to avoid corrosion or to enhance electrical conductivity. Similarly, though some of the base metal in gold alloys is at the surface, of course, the rest is distributed through the body of the article made of the alloy. As a consequence, before the base metals may be attacked chemically and dissolved, traditionally the gold must either also be dissolved or the base metal must be mechanically exposed in a manner comparable to pulverizing ores prior to hydrometallurgical treatment in order to allow access to the metals and minerals contained therein. Thus, in Ida, et al., U.S. Pat. No. 4,426,225, in which base metal is dissolved from beneath gold plate in printed circuit board scrap material, the nitric acid used as an etching medium for the base metal can act only upon such base metal as lies exposed at the margins of gold plated areas. It is stated in Ida, et al., that base metal located beneath gold plated areas becomes accessible to the nitric acid only after the gold of adjacent areas has flaked away as its base metal underpinnings are removed. Other past methods for recovery of gold from scrap generally involve an acid or cyanide reaction in which the gold to be recovered is dissolved, along with the other metals present. The gold is then isolated from the solution in a subsequent step.

A result comparable to that described in Ida, et al., is achieved by the method of Valentine, U.S. Pat. No. 4,261,738, in which base metal intimately bonded to gold is leached off with an ammoniacal solution of an ammonium salt using a leaching liquid containing reactive oxygen. Neither that method nor the Ida, et al., method is described in the references cited as effective to remove alloying metals from gold alloys, sometimes referred to herein as "karat" gold.

Various methods are known for removing metals from their ores, including bits of such metals in elemental form, by leaching with solutions containing oxidizing and complexing agents. Generally such methods require that the ore be pulverized at least before and sometimes during the leaching process. Such ores usually contain a large proportion of copper or other metals base with respect to gold. During such processes, both the gold and the base metals are dissolved before ultimately being recovered by chemical or electrochemical reduction. Examples include Chambers, et al., U.S. Pat. No. 3,692,647; Redondo-Abed, et al., U.S. Pat. No. 4,266,972; and Hougen, U.S. pat. No. 3,880,653. Reynolds, et al., U.S. Pat. No. 4,244,735, teaches a similar method applied to flue dust. With the exception of Chambers, et al., all of the methods referred to are carried out under an oxidizing atmosphere. Chambers, et al., teach the leaching of complex ores with a solution containing cupric chloride and sodium chloride. Chambers, et al., teach that the leaching should be carried out "under conditions which substantially prevent the copper from coming in contact with oxygen. The reason given for this is that, under the conditions therein described, the copper is "readily converted to insoluble oxychloride of copper." (Column 2 at line 20). Chambers, et al., teach as a method adequate to this purpose permitting the various solutions described in the Chambers, et al., process to contact the air so that a surface crust of copper and other metal oxides forms.

Those skilled in the art are not cognizant of a method for isolating gold in metallic form from gold-containing alloys, scrap metal partially or entirely covered by gold by electroplating or mechanical attachment and from scrap electronic components that include metal parts containing or plated with gold, the method being such that the reagents used in the method are not unduly hazardous to workers and the environment; leaching solutions are not consumed but instead may be regenerated in the process and recycled; gold is recovered in metallic form without the need for electrolytic or substantial chemical reduction; and gold-containing materials need not be pulverized or otherwise subdivided as a preliminary step to gold recovery.

BRIEF SUMMARY OF THE INVENTION

The present invention is summarized in that a method for reclaiming gold in metallic form from gold-containing scrap, including gold containing base metal alloys and articles in which base metals are at least partially covered with a layer of gold, includes exposing the gold-containing scrap under an inert atmosphere to a leaching solution. The leaching solution has dissolved therein an oxidizing agent including metal ions capable of assuming at least two oxidation states, a portion of the metal ions being in the higher of the two oxidation states. The leaching solution also contains a complexing agent including means for supplying halide ions in aqueous solution. By so exposing the gold-containing scrap to the leaching solution, base metal contained therein is dissolved to leave a solid metallic residue enriched in gold. The solid metallic residue then is collected mechanically.

A primary object of the invention is to provide a method for recovering gold from gold containing alloys, gold plated scrap metal, scrap electronic components, and the like.

A second object of the invention is to provide such a method in which the portions of alloy, the scrap metal, the electronic components, and the like may be processed to recover the gold therein with a reduced need to comminute, pulverize, or otherwise extensively subdivide the portions of alloy or other material to be acted upon.

Another object of the invention is to provide such a method employing hydrometallurgical techniques that require the use only of mild reagents not very hazardous to workers or to the environment.

A further object of the invention is to provide such a hydrometallurgical method in which the leaching reagents may be regenerated rather than consumed.

Yet another object of the invention is to provide such a method useful for reclaiming gold from scrap electronic circuit boards and the like that does not melt, etch, or otherwise adversely affect the boards themselves.

Other objects, features, and advantages of the invention will be apparent from the following detailed description of the preferred embodiment of the method of the invention.

DETAILED DESCRIPTION OF THE PREFERRED EMBODIMENT

The method of the invention is a hydrometallurgical procedure for the selective recovery of gold in metallic form from gold-containing alloys and from articles in which metals base with respect to gold are partially or entirely covered with a layer of gold, however applied. Hereinafter, such gold-containing alloys and base metal articles or pieces covered with gold shall be referred to collectively as "gold-containing scrap." In its simplest embodiment, the method of the invention may be characterized as a two-step process in which the base metal of gold-containing scrap is leached away by exposure to a selectively oxidizing leaching solution to leave behind a solid metallic residue enriched in metallic gold and a reacted leaching solution containing oxidized and solubilized base metal. The metallic gold is then collected mechanically for use, often without the need for subsequent extensive purification processes. Optional additional steps include the recovery of base metals from the reacted leaching solution and the oxidizing for recycling of a portion of the reacted leaching solution, both steps preferably accomplished by conventional electrochemical means, such as those disclosed by Chambers, et al., with respect to copper and other base metals.

Another optional step, especially valuable when the gold-containing scrap is a solid piece of gold alloy of substantial size, is the subdivision of the gold-containing scrap. Such subdivision improves access of the leaching solution to base metal in the scrap. The metallic residue remaining after a first exposure of the gold-containing scrap to the leaching solution tends to be brittle. Consequently, subdivision of the gold-containing scrap after a first exposure to the leaching solution is relatively easy. The subdivided, once-leached scrap may then be subjected to a second exposure to the leaching solution, with the remainder of the method proceeding without change. The step of subdividing the gold-containing scrap offers less additional advantage when the scrap is a gold-plated or gold-filled object.

In the method of the invention, gold-containing scrap first is exposed under an inert atmosphere to a leaching solution having means to oxidize and form soluble halide complexes with metals base with respect to gold. The leaching solution contains dissolved therein an oxidizing agent including a soluble halide of a metal ion having at least two oxidation states, a portion of the metal ion in solution being in the higher of the two oxidation states. The metal ion of the oxidizing agent is selected as one that, in the higher of the two oxidation states, is an oxidant sufficiently effective to oxidize base metals present in metallic form in the gold-containing scrap to ions capable of forming soluble halide complexes. In addition, the leaching solution includes a complexing agent dissolved therein, the complexing agent preferably including a strongly dissociable halide compound such as a hydrogen halide, a halide salt of an alkali or alkaline earth metal, or a means for supplying halide ions in aqueous solution functionally equivalent thereto. An "inert atmosphere" shall be understood to include nitrogen, carbon dioxide, argon, water vapor, and any other atmosphere incapable of readily oxidizing the metal ion having at least two oxidation states from its lower to its higher oxidation state. In practice, a nitrogen atmosphere is preferred as effective, economical, and convenient.

The oxidizing agent is present in quantities sufficient to oxidize a desired portion and preferably all of the base metal to ions of the base metal capable of forming soluble halide complexes. Thus, when the oxidizing agent is cupric chloride and the alloyed base metal is copper, for each mole of metallic copper, at least one mole of cupric chloride should be present in the leaching solution. In practice, a concentration of the oxidizing agent is preferred that is sufficiently high to allow the oxidation of base metals present in the gold-containing scrap to go to completion within a desirably short time under selected reaction conditions of temperature and pressure. The complexing agent must be present in an amount sufficient to and preferably in excess of that amount necessary to supply halide ions in a quantity effective to form soluble complexes with the oxidized base metal, in light of the presence of any additional halide ions made available by the reduction of the oxidizing agent or otherwise.

The preferred leaching solution is an acidic aqueous solution of cupric chloride as oxidizing and sodium chloride as complexing agent. The preferred pH of the leaching solution so constituted is a pH below approximately 3.0. It is preferred to adjust pH where appropriate by addition of a hydrogen halide such as HCl or HBr. An alternative embodiment of the leaching solution contains calcium chloride as the complexing agent instead of sodium chloride. As is shown below in the examples, the use of calcium chloride as the complexing agent results in a gold-enriched, solid residue after leaching having a higher percentage of gold than that resulting when sodium chloride is used as the complexing agent. However, in each instance the reacted leaching solution contains a measurable amount of dissolved gold after the leaching reaction has been completed, and that amount is higher when calcium chloride is utilized as the complexing agent. Thus, before a choice of complexing agent can be made in any particular instance, the relative importance must be weighed of the loss of some gold into solution or the retaining of higher concentrations of impurities in the gold-enriched, solid residue.

A third alternative embodiment of the leaching solution includes ferric chloride as the oxidizing agent instead of cupric chloride. Exposure of gold-containing scrap to this embodiment of the leaching solution leaves a gold-enriched, solid residue with a minimal amount of gold dissolved in the leaching solution at the end of the reaction. However, there are possible disadvantages to using ferric compounds as the oxidizing agent. In the event it is desired to recover the base metals leached away from the gold by the leaching solution, the metal ions of the iodizing agent themselves must be dealt with as a dissolved metal present in the leaching solution. If the base metals included in the gold-containing scrap are different from the metal ion of the oxidizing agent, the oxidizing agent represents a newly introduced impurity that may complicate isolation of the base metals in pure form. Iron is not a metal commonly alloyed with or used underlying gold. Consequently, the value of ferric chloride as an oxidizing agent in the leaching solution is reduced in those instances affected by the considerations just reviewed. In contrast, if the method of the invention is to be applied to recover gold from iron-containing scrap, ferric chloride may be the oxidizing agent of choice.

An inert atmosphere is achievable by various means. Thus, the leaching solution maybe sparged with nitrogen, preferably in a reaction vessel having a relatively restricted opening to the atmosphere. Such sparging serves both to establish an inert atmosphere over the surface of the leaching solution and to remove oxygen previously dissolved in the leaching solution. Sparging has the further advantage of agitating the leaching solution, with the result of speeding the dissolution of the base metals, as shall be discussed below. Alternatively, the leaching solution may be briskly boiled in a reaction vessel having a restricted opening to the atmosphere. The result is both to drive atmospheric gases from the leaching solution and also to flush them from the reaction vessel, filling it with water vapor. The method taught by Chambers, et al., of exposing solutions to atmospheric oxygen to form oxide scums or crusts in order to exclude oxygen from reaction vessels is not adequate for the performance of the method of the invention.

It is preferred that the step of exposing the gold-containing scrap to a leaching solution be conducted at elevated temperatures to speed the dissolution of the base metals. Any temperature shall be deemed "elevated" if above ambient room temperature (commonly between about 15° and 45° C.) and no higher than the boiling temperature of the leaching solution at the reaction pressure selected. The preferred temperature is the boiling temperature of the leaching solution, which at one atmosphere typically is a temperature slightly above 100° C. and usually less than 110° C. Higher temperatures under pressurized conditions are possible and are included within the scope and spirit of the invention. However, the dissolution of base metals by the leaching solution at boiling temperatures achievable at one atmosphere has been found to be prompt enough to be satisfactory for most commercial applications. Therefore, because of the cost and inconvenience of operating at pressures elevated above atmospheric pressure, the preferred temperature and pressure are ambient atmospheric pressure and the highest temperature obtainable at that pressure.

Agitation of the leaching solution speeds the dissolution of the base metal in the gold-containing scrap, although leaching without agitation is also possible and is included within the scope and spirit of the invention. Because of the relative ease of accomplishing agitation and the significant advantage of it, it is preferred that the step of exposing the gold-containing scrap to a leaching solution include agitating the leaching solution. Sparging the leaching solution with nitrogen or another non-oxidizing gas is an effective way of agitating the leaching solution and is preferred.

The second step of the method of the invention is to mechanically isolate the solid metallic residue of the leaching process just described. Any conventional means for isolating metallic solids from a liquid may be used, including filtering and centrifuging. When gold is being reclaimed from electronic circuit boards and the like, which represent a non-metallic residue, the step of mechanically isolating the solid metallic residue includes removing the circuit boards from the leaching solution and, preferably, rinsing into the leaching solution any solid metallic residue resting loosely thereon. The fluid used to rinse the circuit boards should not be allowed to so change the concentrations of oxidizing agent, complexing agent, and the reaction products of the leaching process that the solubility of the metals present either in dissolved or solid form is changed to an extent undesirable to the user of the method. This can most easily be achieved by redirecting over the circuit boards or comparable non-metallic residue filtered portions of the reacted leaching solution itself. However, unreacted leaching solution or even water in relatively small quantities will be satisfactory for rinsing purposes in most cases.

A small amount of gold will be found to have been oxidized and solubilized in the form of halide complexes as a consequence of the step of exposing the gold-containing scrap to the leaching solution, disclosed above. Therefore, the step of mechanically isolating the solid metallic residue preferably includes as an initial step the reduction of dissolved gold to solid, metallic form by exposure of the reacted leaching solution to elemental metal that is base with respect to gold. Preferably the base metal used for this purpose is one already present as a dissolved base metal in the reacted leaching solution. For most gold-containing scrap, the metal of choice will be copper, although iron is a suitable alternative. It is preferred that the elemental base metal be in a form that is conveniently removable from the reacted leaching solution without interference with the mechanical isolation of the solid metallic residue of the leaching process. Thus, exposure of the reacted leaching solution to a mesh of copper strands that is easily manipulated as a unit is preferred to dusting the reacted leaching solution with finely divided copper.

The ability of gold to remain in solution in halide complexes is reduced as the temperature of the reacted leaching solution is reduced. Therefore, it is preferred that the step of mechanically isolating the undissolved metallic residue include quenching the hot, reacted leaching solution at least to room temperature and preferably to a temperature of from 20° to 25° C. but, in any event, to a temperature not below the freezing temperature of the reacted leaching solution.

After filtering or otherwise removing the gold-enriched metallic residue from the reacted leaching solution, it is possible to oxidize the base metal ions in that solution and thus regenerate it for reuse as an unreacted leaching solution. This may be accomplished either by air oxidation of the ions or, more preferably, by conventional electrochemical means. Air oxidation is achieved by the addition of an acid halide, preferably HCl. or HBr, followed by sparging air through the reacted leaching solution to achieve the following reaction:

$$2CuCl_3^{2-} + 2HCl + \tfrac{1}{2}O_2 \rightarrow 2CuCl_2 + H_2O + 4Cl^-$$

The reacted leaching solution so treated contains oxidized base metal ions comparable to those present in the original leaching solution and can be recycled for use as a leaching solution to process additional gold-containing scrap.

A preferable alternative to air oxidation of the base metal ions in the reacted leaching solution is electrochemical oxidation and reduction of the metal ions in the reacted leaching solution. The pertinent reactions would be the following:

$$CuCl_3^{2-} + e^- \rightarrow Cu + 3Cl^- \text{ cathode}$$

$$CuCl_3^{2-} \rightarrow CuCl_2 + Cl^- + e^- \text{ anode}$$

Electrochemical oxidation and reduction has the advantage of recovering at the cathode the base metal leached from the gold-containing scrap rather than permitting it to accumulate in solution. The operation is carried out in an electrolysis cell that is divided into anode and cathode chambers by an inert membrane. Cathodes made of the base metal to be recovered have proven convenient and effective. Anodes commonly are carbon. An electrical current is applied across the cell, and base metal is plated out at the cathode while the metal ion oxidizing agent is regenerated at the anode.

Except where otherwise specified, the given concentrations, times, reaction temperatures, and the like noted above are not critical, with much variation possible.

The following examples are supplied to illustrate and further disclose the method of the invention. It is to be understood that the examples given record only particular instances and examples of the method of the invention. The present invention is not limited to the reagents, concentrations, steps, reaction conditions, gold-containing scrap or methods disclosed in the examples. Instead, it embraces all such modified forms thereof as come within the scope of the claims following thereafter.

EXAMPLE 1

A 10 kt gold alloy sample was procured that was analyzed as containing 40.8% gold, 49.2% copper, 6% silver, and 4% zinc, as measured by x-ray microprobe. The percentage amounts cited in this and the following examples are weight percents. The sample was rolled into foil approximately 0.002 inches thick and then was cut into rectangular pieces of approximately 0.36 inches by 0.1 inches.

A portion of the sample was taken weighing 2.2 grams and was placed within a 250 ml round-bottom flask having a pyrex thermometer well and three ground-glass fittings. The flask was fitted with a sparge tube and with a condenser to reflux boiling solutions. About 125 ml of an aqueous leaching solution was added containing 3.42 M NaCl, 0.6 M $CuCl_2$, and 0.1 M HCl. The temperature of the flask was elevated to 103° C. The leaching solution was stirred magnetically and was sparged with nitrogen continuously.

Samples of the leaching solution were removed periodically and analyzed for gold by atomic absorption spectroscopy over a 22 hour leaching period, at the end of which time 1.055 grams of solid residue were recovered from the reaction flask. The residue was analyzed and found to contain 84.2% gold and 5.06% copper, both in elemental form. Most of the sample retained its structural integrity, but it had become very brittle. Scanning electron micrographs were taken of representative portions of the sample and showed the development of deep pits thereon. The formation of the pits was thought to be indicative of selective base metal leaching by the leaching solution. This theory was substantiated by the observed decrease of copper concentration in the specimen from 49.2% to 5.06%, while gold increased from 40.8% to 84.2%.

The concentration of gold in the leaching solution over time was found to be as follows:

TABLE 1

| Duration of Leach (Hours) | Composition of Leaching Solution (Micrograms gold per milliliter) |
|---|---|
| 0.0 | 0.0 |
| 0.5 | 1.8 |
| 0.75 | 1.2 |
| 1.00 | 0.9 |
| 2.25 | 0.76 |
| 3.00 | 0.75 |
| 4.00 | 0.57 |
| 5.00 | 0.56 |
| 22.5 | 0.51 |

The concentrations of dissolved gold listed above show an initial dissolution of gold. This was confirmed visually in the scanning electron micrographs by observation of the removal of original surface features of the sample. The decrease in gold solubility with time that was observed is believed to be the result of decreasing oxidation potential with the increasing presence of reductive cuprous ions resulting from the oxidation of elemental copper in the sample by the cupric chloride of the leaching solution. Gold initially dissolved to give gold concentrations in excess of three times the gold concentration ultimately present. This fact suggests that the kinetics of gold dissolution were faster than those of the dissolution of the base metals present.

EXAMPLE 2

The procedure of Example 1 was repeated, including materials and reagents, except as specified below. A rolled gold-plated watch case initially weighing 2.0107 grams and was used as gold-containing scrap. The watch case was cut in half to allow its entry into the reaction flask. After the gold-containing scrap was exposed to leaching solution for ten hours, flakes of a gold-colored material remained, weighing 0.0185 grams. This solid residue of the leaching process was analyzed to be 70% gold. Although the duration of exposure to the leaching solution was ten hours, most of the base metals were determined by visual inspection to be dissolved by the end of the third hour.

It was visually observed that the base metals of the watch case seemed to dissolve in many locations and not simply from that surface of the base metals that was exposed by cutting the watch case in half. It is believed that pits formed in the gold alloy coating of the watch case in a manner comparable to that described in the previous example. By this means, the leaching solution was provided access to the underlying base metals in many locations. Evidence of pitting was verified by scanning electron micrographic examination of the surface of a comparable watch case similarly treated in a separate experiment. Thus, this example demonstrated that gold-clad articles may be successfully subjected to the method of the invention without the need for prior subdivision or comminution of the gold-containing scrap.

EXAMPLE 3

The procedure of Example 1 was followed, except as may be noted below, with a conventional electrical circuit board used as the gold-containing scrap. The electrical circuit board included plug contacts on which gold had been plated. The gold-containing scrap was exposed to the leaching solution for six hours. In fact, the greater portion of the base metal was believed to have dissolved in under one hour and perhaps even under one-half hour, as determined by visual inspection of the electrical circuit board.

It was found that exposure to the leaching solution successfully stripped off all the metallic material of the plug contacts. The plastic material of the circuit board suffered no apparent adverse effects. The base metals were confirmed by visual inspection to be entirely solubilized. The solid metallic residue essentially consisted of very thin shavings of gold that apparently was the gold-plated surface portion of the contacts remaining after the underlying base meal substrate was solubilized. This solid residue was easily recovered by filtration. The residue weighed 0.0318 grams and was analyzed to be 92% gold.

EXAMPLE 4

The experiment of Example 3 was repeated using a different circuit board as the gold-containing scrap. A substantial portion of the weight of the board, 21%, was solubilized by the leaching solution and is believed to have consisted of base metal. Solid metallic residue weighing 0.01746 grams was recovered and was analyzed to be 93% gold. This residue contained particles smaller than those observed in the experiment reported as Example 3. It is believed that the gold plate present on the circuit board of this example probably was thinner than that of the circuit board of Example 3, resulting in a greater amount of mechanical breakage and subdivision of the gold during the exposure to leaching solution.

EXAMPLE 5

The procedure of Example 1 was repeated, with the changes disclosed below and a 10 kt rolled gold plate watch case used as the gold-containing scrap. Calcium chloride was used as the complexing agent instead of sodium chloride. The leaching solution was a 5 M $CaCl_2$, 0.6 M $CuCl_2$, 0.1 M HCl solution. The original mass of the watchcase before leaching was 3.3215 grams. The tempeature of the leaching solution during the process of exposing the gold-containing scrap to the leaching solution was from 101° to 104° C. The gold-containing scrap was exposed to the leaching solution for two hours. Solid metallic residue weighing 0.0625 grams was recovered by filtration. The gold content of the residue was 96%. The gold content of the reacted leaching solution was 0.55 micrograms per milliliter at 109° C. When the reacted leaching solution was cooled to 24° C., the concentration of gold was reduced to 0.40 micrograms per milliliter. Before the solid metallic residue was recovered, the reacted leaching solution was exposed to an excess of electrolytic elemental copper. This was done to consume any remaining cupric ions in the leaching solution, thereby decreasing the oxidizing strength of the solution. After the copper had been added, the dissolved gold content of the reacted leaching solution was found to be 0.53 micrograms per milliliter at 109° C.

It will be noted that the data for the calcium chloride-containing leaching solution resembles that for the sodium chloride solutions utilized in the previous examples. The leaching solution containing calcium chloride selectively leached base metals to leave a solid metallic residue greatly enriched in gold. In fact, the leaching solution of this example produced a residue that was purer in gold than that of the sodium chloride leaching solutions. In addition, the intensity of the solubilizing attack on the base metal of the watch case was observed to be greater than that of the leaching solutions of the previous examples.

The calcium chloride-containing leaching solution clearly seemed to exhibit a greater complexing power. One result of the apparently greater complexing power was the greater concentration of gold in the reacted leaching solution. The reduction in leaching solution temperature caused a reduction in dissolved gold concentration of about 20%, confirming the value of that step. However, attempted recovery of solubilized gold by the addition of elemental copper seemed not to produce a significant decrease in the concentration of dissolved gold. It was noted that at then current gold prices of about $350.00 per troy ounce, the value of the gold remaining in the solution even before reducing the temperature of the solution and exposing it to elemental copper would be valued at less than one-half cent per liter. Thus, for practical purposes, even without that exposure to elemental copper, the method of the invention as embodied in this example is satisfactory. A leaching solution containing cupric chloride and any other alkali or alkaline earth chloride salt would be expected to behave similarly to the leaching solutions of this and the previous examples.

EXAMPLE 6

The procedure of Example 5 was followed except as noted below. A portion of the same watch case as was used in the experiment of Example 5 was utilized as the gold-containing scrap. The leaching solution contained the following substances in the concentrations indicated: 3.42 M NaBr, 0.6 M $CuBr_2$, and 0.1 M HBr. The mass of the gold-containing scrap was 3.5153 grams. The temperature of the leaching solution was maintained between 102.5° C. and 104° C. The leaching process was continued for two hours. Solid metallic residue weighing 0.1258 grams was collected. The gold content of the residue was found to be 41.4%. The gold content of the reacted leaching solution was found to be 28.2 micrograms per milliliter at 103.5° C., which was reduced to 4.06 micrograms per milliliter when the reacted leaching solution was cooled to 24° C., and was further reduced after exposure to elemental copper to 1.42 micrograms per milliliter at 103° C. The experiment showed that halides other than chloride were effective in performing the method of the invention.

EXAMPLE 7

The method of Example 5 was followed, except as noted below. A 10 kt, rolled gold plate watch case was utilized as the gold-containing scrap, the watch case being different from those watch cases used in the previous example with a consequent difference in overall gold content. Ferric chloride was used as the oxidizing agent of the leaching solution instead of cupric chloride. A smaller molar amount of ferric chloride was used in comparison to the cupric chloride because of the lower solubility of the ferric chloride. The leaching solution contained the following substances in the concentrations specified: 3.42 M NaCl, 0.4 M $FeCl_3$, and 0.1 M HCl. The mass of the gold-containing scrap was 1.3917 grams. The leaching solution was maintained at a temperature of approximately 103° C. Leaching was continued for 2.25 hours. Solid metallic residue weighing 0.0684 grams was collected by filtration. The gold content of the residue was found to be 96.6%. The reacted leaching solution had a dissolved gold concentration of 1.52 micrograms per milliliter at 103° C. After the reacted leaching solution was exposed to elemental copper, the gold content of the reacted leaching solution was so small as to be undetectable.

By visual inspection, it was noted that the reaction rate was very fast. Within one hour of exposure to the leaching solution, the watch case had disintegrated.

EXAMPLE 8

The process of Example 7 was repeated with pieces of scrap electrical circuit board comparable to those used in the prior examples utilized as the gold-containing scrap. The visually apparent results of use of the ferric chloride-containing leaching solution were comparable to those obtained by use of the cupric chloride-containing leaching solution. Solid metallic residue weighing 0.0329 grams was recovered having a gold content of 87.6%. The reacted leaching solution had a gold concentration of 7.32 micrograms per milliliter at approximately 103° C. After treatment with elemental copper, the concentration of dissolved gold was reduced to the point of being undetectable. Examples 7 and 8 demonstrate that metals other than copper can be utilized as the oxidizing agent in the method of the invention.

What is claimed is:

1. A method for reclaiming gold in metallic form from gold-containing scrap including gold-containing base metal alloys and articles in which base metals are at least partially covered with a layer of gold, the method comprising:

(a) exposing the gold containing scrap under an inert atmosphere to a leaching solution having dissolved therein an oxidizing agent consisting essentially of metal ions capable of assuming at least two oxidation states, a number of the metal ions sufficient to oxidizing the quantity of base metal present in the base metal alloys being in the higher of the two oxidation states, and a complexing agent consisting essentially of a supply of halide ions in aqueous solution, to dissolve base metal from the gold-containing scrap to leave a solid metallic residue enriched in gold; and (b) mechanically collecting the solid metallic residue.

2. The method of claim 1 wherein the metal ions of the oxidizing agent consist essentially of cupric ions.

3. The method of claim 1 wherein the metal ions of the oxidizing agent consist essentially of ferric ions.

4. The method of claim 1 wherein the step of exposing the gold-containing scrap to a leaching solution is conducted at a temperature elevated above the ambient temperature and no higher than approximately the boiling temperature of the leaching solution, and the reacted leaching solution is cooled to a temperature not less than its freezing temprature before the step of mechanically collecting the solid metallic residue.

5. The method of claim 4 wherein the step of exposing the gold-containing scrap to a leaching solution is conducted at atmospheric pressure.

6. The method of claim 4 wherein the step of mechanically collecting the solid metallic residue includes the step of exposing the reacted leaching solution to an elemental base metal prior to the step of cooling the reacted leaching solution to effectively force out of solution a portion of any gold dissolved in the reacted leaching solution.

7. The method of claim 1 wherein the complexing agent consists essentially of an aqueous solution of a halide compound selected from the group consisting of a hydrogen halide, a halide salt of an alkali metal, a halide salt of an alkaline earth metal, and a combination of any two or more of such halide compounds.

8. The method of claim 7 wherein the halide compound is selected from the group consisting of sodium chloride, calcium chloride, sodium bromide, and calcium bromide.

9. The method of claim 1 wherein the step of mechanically collecting the solid metallic residue includes the step of exposing the reacted leaching solution to an elemental base metal to effectively force out of solution gold dissolved in the reacted leaching solution.

10. The method of claim 1 including, after the step of mechanically isolating the solid metallic residue from the reacted leaching solution, the step of oxidizing base metal ions remaining in the reacted leaching solution, whereupon the reacted leaching solution containing such oxidized base metal ions may be recycled within the method as leaching solution.

11. The method of claim 10 wherein the step of oxidizing base metal ions remaining in the reacted leaching solution includes sparging the reacted leaching solution with an oxidizing gas.

12. The method of claim 11 wherein the oxidizing gas consists essentially of oxygen.

13. The method of claim 10 wherein the step of oxidizing base metal ions remaining in the reacted leaching solution includes the step of electrolytically recovering dissolved base metal from the reacted leaching solution and converting metal ions of the oxidizing agent to the higher oxidation state, whereupon the reacted leaching solution so electrolyzed may be recycled as leaching solution.

* * * * *